United States Patent [19]

Manning et al.

[11] Patent Number: 4,633,763
[45] Date of Patent: Jan. 6, 1987

[54] SWITCH AND VALVE ASSEMBLY

[75] Inventors: Steven F. Manning, Londonderry, N.H.; Jimmie G. Perkins, Monroe, Tenn. Dennis H. Heling, Milford, Mich.

[73] Assignee: Ex-Cell-O Corporation, Troy, Mich.

[21] Appl. No.: 699,603

[22] Filed: Apr. 15, 1985

Related U.S. Application Data

[63] Continuation of Ser. No. 525,847, Aug. 24, 1983, abandoned.

[51] Int. Cl.⁴ ............................................. F15B 11/00
[52] U.S. Cl. ......................................... 91/530; 91/469; 137/883; 200/83 Q; 60/911
[58] Field of Search ................ 91/469, 530; 251/323; 200/61.86, 83 Q; 60/431, 911; 137/883

[56] References Cited

U.S. PATENT DOCUMENTS 4,330,007  5/1982  Leskovec ............................. 91/530

4,498,500  2/1985  Miller ................................. 137/883

*Primary Examiner*—Abraham Hershkovitz
*Attorney, Agent, or Firm*—John P. Moran

[57] ABSTRACT

A switch and valve assembly for inflating or deflating a pair of bladders mounted in the back and seat regions of a vehicle seat. The assembly houses two normally-closed valve assemblies and two normally-open electrical switch assemblies, with two pushbutton-actuated stems adapted to selectively either partially open the valve assemblies by partial depression of the pushbuttons to thereby bleed-off fluid under pressure from respective bladders, or to fully open the valve assemblies while closing the switch assemblies by full depression of the pushbuttons to thereby actuate the pump to provide fluid under pressure to fill the respective bladders as desired for operator riding comfort or support. Pressures in the two bladders may be changed individually or concurrently.

4 Claims, 6 Drawing Figures

4,633,763

SWITCH AND VALVE ASSEMBLY

This application is a continuation of application Ser. No. 525,847, filed Aug. 24, 1983 now abandoned.

TECHNICAL FIELD

This invention relates generally to hand operated switch and valve assemblies and, more particularly, to such an assembly for inflating and deflating bladders mounted in a vehicle seat adjacent the lumbar and thigh regions of the vehicle operator.

BACKGROUND ART

While various arrangements have been used satisfactorily in the past to control the pressure in back and/or seat portions of a vehicle seat, it is desirable to provide a compact, efficient and economical pushbutton-type arrangement for controlling the pressures in lumbar and thigh bladders mounted in such a seat.

DISCLOSURE OF THE INVENTION

Accordingly, it is a general object of the invention to provide an improved compact, efficient and economical pushbutton-type switch and valve assembly for controlling two vehicle seat bladders.

Another object of the invention is to provide an improve dual pushbutton-type normally open switch and normally closed valve assembly, wherein a partial depression of one or both pushbuttons causes fluid pressure in the associated seat bladder or bladders to bleed off through the valve, while a full depression of one or both pushbuttons closes the switch and actuates a pump which provides sufficient fluid pressure through the valve to inflate the bladder or bladders, overcoming any bleed-off action.

A further object of the invention is to provide a switch and valve assembly, including a housing, two external pushbuttons, a stem extending from each pushbutton into and through respective chambers in the housing and, thence, into a common chamber, a normally closed, spring-loaded valve in each of the respective chambers operatively connected to the respective stems so as to open by any downward movement of the stems, passage means from the respective chambers to respective bladders, a pump, passage means from the pump to each of the respective chambers, and normally open dual switch means in the common chamber selectively closed by full depression of the respective stems to supply a fluid under pressure to one or both bladders through the respective valves.

These and other objects and advantages of the invention will be apparent when reference is made to the following description and accompanying drawings.

BEST MODE OF CARRYING OUT THE INVENTION

Figure 1:
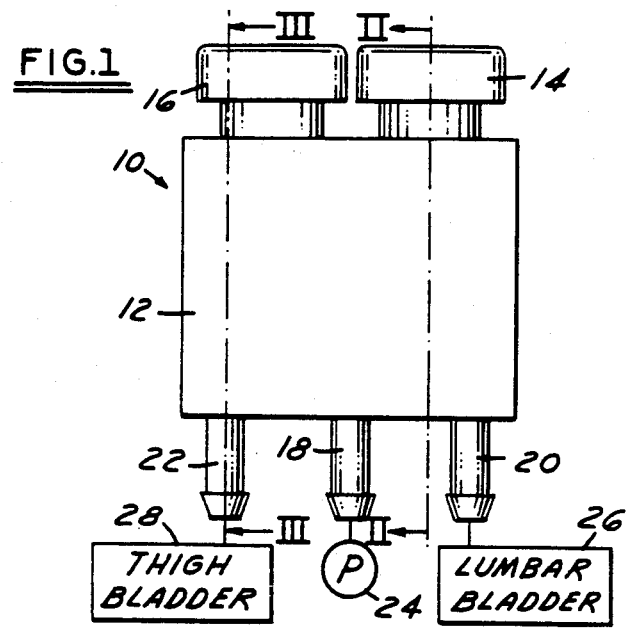
FIG. 1 is a front elevational view of a housing embodying the invention.

Referring now to the drawings in greater detail, FIG. 1 illustrates a dual switch assembly 10 including a housing 12, two pushbuttons 14 and 16, and three inlet connections 18, 20 and 22. The connection 18 is illustrates schematically as being connected to a pump 24, while the connectors 20 and 22 are illustrated schematically as being connected to respective lumbar and thigh bladders represented as 26 and 28. Such bladders would typically be installed in a vehicle seat assembly (not shown).

Figure 4:
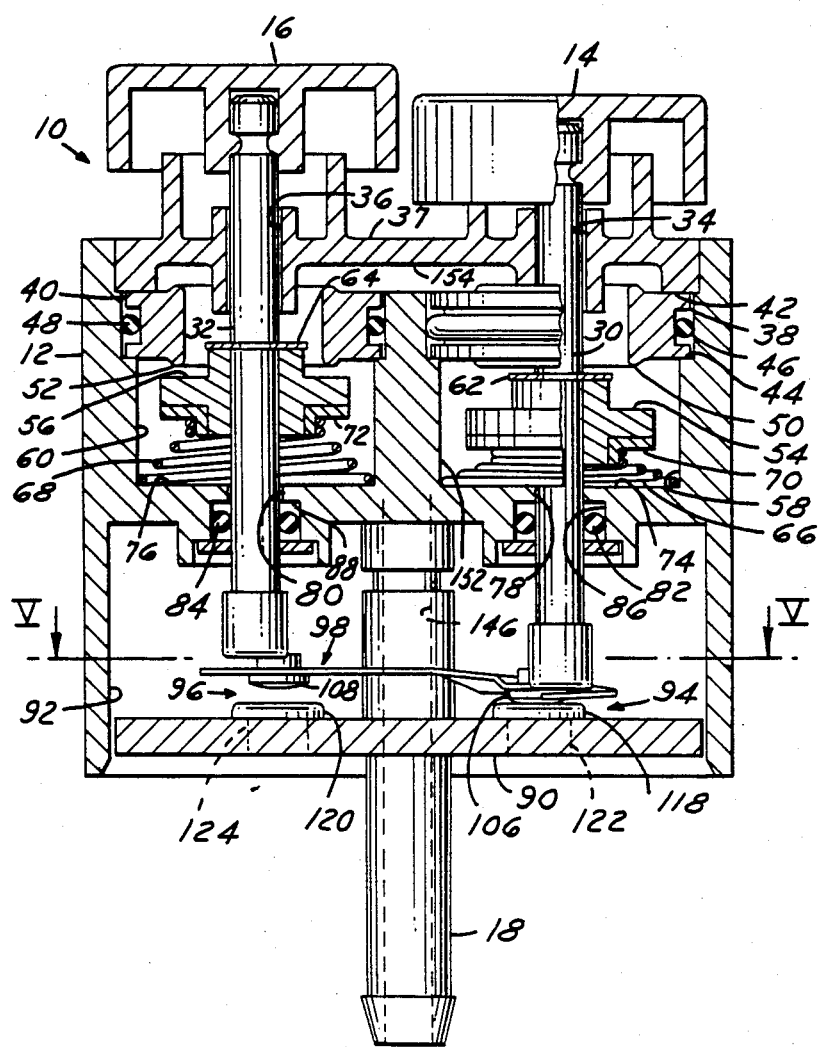
FIG. 4 is a cross-sectional view of the FIG. 1 structure showing two operational conditions.

As shown in FIG. 4, the housing 12 houses a pair of stems 30 and 32 secured at their upper ends to the pushbuttons 14 and 16, respectively, and slidably mounted through openings 34 and 36 formed in the upper wall 37 of the housing 12. A pair of sleeves 38 and 40 are secured between annular shoulders 42 and 44 formed on the upper wall 37 and in the housing 12, respectively, with respective seal rings 46 and 48 mounted therearound to prevent leakage therepast. The bottom inner peripheral edges of the sleeves 38 and 40 protrude slightly and serve as valve seats 50 and 52.

A pair of valve members 54 and 56 are mounted in respective chambers 58 and 60 around the respective stems 30 and 32, and secured in place therearound by C-rings 62 and 64. Coil springs 66 and 68 are mounted around the stems 30 and 32, between respective spring seats 70 and 72 formed on the bottom faces of the valve members 54 and 56 and end walls 74 and 76 of the chambers 58 and 60. The stems 30 and 32 extend through respective openings 78 and 80 formed in the walls 74 and 76. Seal rings 82 and 84 are mounted in annular pockets 86 and 88 in the walls 74 and 76 around the respective stems 30 and 32 to prevent leakage therepast from the chambers 58 and 60.

In between the walls 74 and 76 and a bottom wall 90 of the housing 12 there is formed a large single chamber 92 into which the lower ends of the stems 30 and 32 extend. A pair of switches 94 and 96 are mounted in the chamber 92. As better shown in FIGS. 5 and 6, a V-shaped, sheet-like spring member 98 is secured via an opening 100 formed in its center section 102 to a fixed post 104, with a first pair of contacts 106 and 108 mounted in respective openings 110 and 112 formed adjacent the ends of the legs 114 and 116 of the spring member 98. A second pair of contacts 118 and 120 are mounted in openings 122 and 124 formed in the wall 90. Wire leads, such as the leads 126 shown in FIG. 6, are connected to the latter contacts 118 and 120, and lead to suitable electric motor means (not shown) for actuating the pump 24. It may be noted from FIGS. 2, 4 and 5 that the ends of the stems 30 and 32 are positioned directly above a pair of protrusions 130 and 132 formed on the ends of the legs 114 and 116 adjacent the first pair of contacts 106 and 108.

Figure 5:
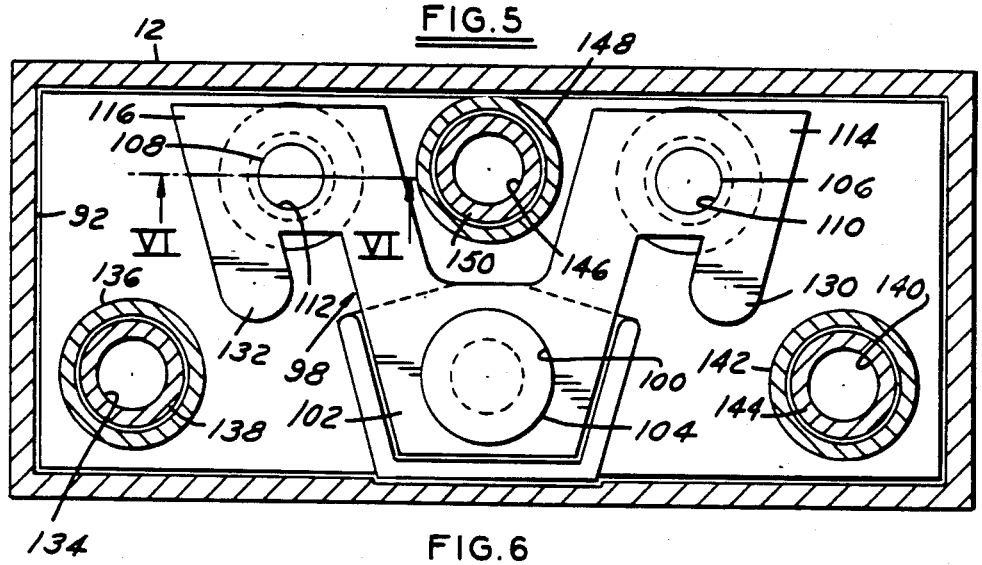
FIG. 5 is a cross-section view taken along the plane of the line V—V of FIG. 4, and looking in the direction of the arrows.
Figure 6:
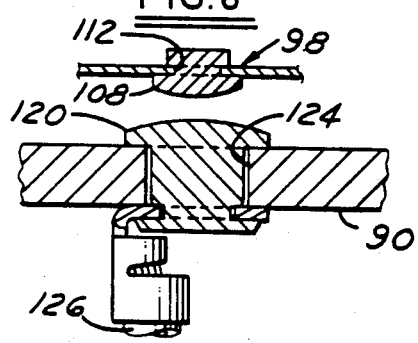
FIG. 6 is a fragmentary cross-sectional view taken along the plane of the line VI—VI of FIG. 5, and looking in the direction of the arrows.
Figure 3:
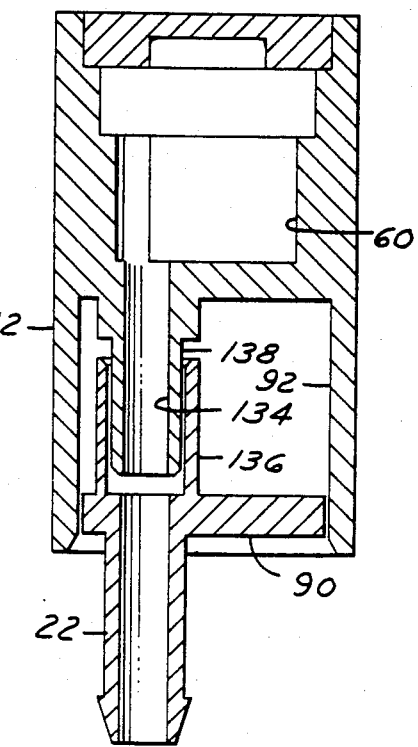

Referring now to FIGS. 3 and 5, the thigh connector 22 is seen to communicate via a passageway 134 formed in telescoping cylindrical extensions 136 and 138 from the walls 90 and 76, respectively, across the chamber 92 to the chamber 60. It is in like manner that the lumbar connector 20 communicates via a passageway 140 (FIG. 5) formed in telescoping cylindrical extensions 142 and 144 from the walls 90 and 74 across the chamber 92 to the chamber 58 on the other side of the housing 12. The pump connector 18 (FIGS. 4 and 5) communicates via a passageway 146 formed in telescoping cylindrical extensions 148 and 150 from the walls 90 and 74/76 across a chamber 92 and then vertically through a wall 152 intermediate the chambers 58 and 60 to a recess 154 formed in the upper wall 37. The recess 154 communicates with both the chambers 58 and 60 (FIG. 4).

Figure 2:
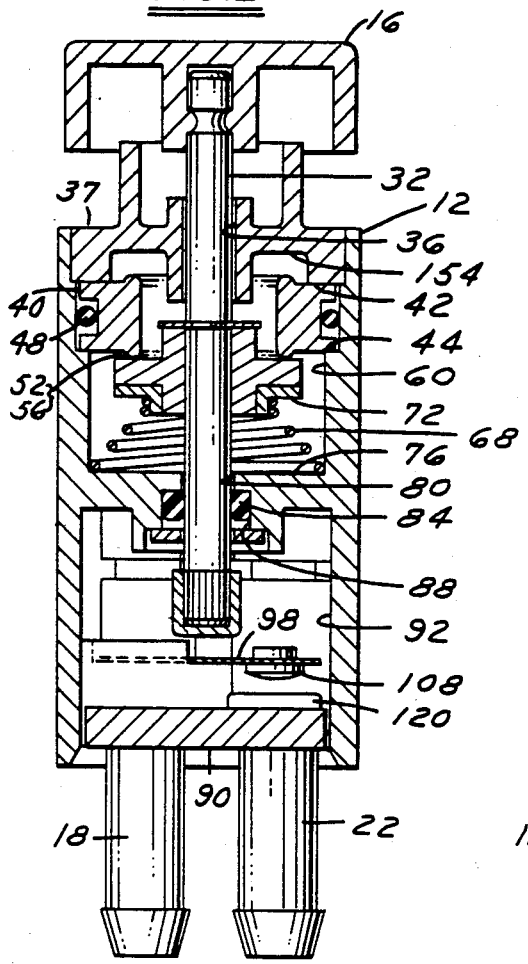
FIGS. 2 and 3 are cross-sectional views taken along the planes of the lines II—II and III—III, respectively, of FIG. 1 and looking in the direction of the arrows, FIG. 2 illustrating the inoperative or closed valve condition.

Insofar as operational conditions are concerned, the thigh bladder valve 52/56 is shown in FIG. 2 in the closed position, and the contacts 108 and 120 out of contact. In FIG. 4, the valve 52/56 is shown in a first open position, while the contacts 108 and 120 remain out of contact. In FIG. 4, the lumbar bladder valve 50/54 is shown in a second open position, with the contacts 106 and 118 now closed. Each of the lumbar and thigh sub-assemblies may be placed in any of the three relationships at any time.

In operation, it's apparent in FIG. 2 that when the pushbutton 16 is released, there results a normally closed-valve and normally open-contacts condition, whereas in FIG. 4 it is apparent that the pushbutton 16 must be depressed only slightly, against the force of the spring 68, to cause an open valve 52/56 and open contact 108/120 condition, and that the pushbutton 14 is depressed as far as possible, against the force of the spring 66, to cause an open valve 50/54 and closed contact 106/118 condition.

Inasmuch as the closing either the contacts 108/120 or 106/118 serves to actuate the pump 24, forcing a suitable fluid under pressure through the connector 18 and passageway 146 into the recess 154 adjacent the chambers 58 and 60, with either valve 52/56 or 50/54 open, the fluid enters the respective chamber 60 or 58 and, hence, the respective thigh or lumbar bladder 28 or 26. In the open-valve, open-contacts condition (left side of FIG. 4), the pump 24 is not actuated and, hence, fluid will bleed from the respective bladder, i.e., bladder 28 in this instance, thereby decreasing the pressure in the surrounding portion of a vehicle seat. Specifically, the bleed circuit is from the bladder 28 via the inlet connection 22, the chamber 60, the valve 52/56, the recess 154, and out through the passageway 146 of the inlet connection 18 to the pump 24, while the latter is not operating, and thence to the atmosphere. In the open-valve, closed-contact condition (right side of FIG. 4), the pump 24 is actuated, pumping fluid through the connector 18, the passageway 146, the recess 154, and the chamber 58 in this instance, and the passageways to the lumbar bladder 26, overcoming the above described bleeding action and increasing the pressure in the bladder. Release of the pushbuttons 14 and/or 16 permits the springs 66 and/or 68 to close the adjacent valve or valves and thereby hold the desired pressure in the respective bladders.

INDUSTRIAL APPLICABILITY

It should be apparent that the invention provides a compact, efficient and economical, pushbutton-operated dual valve and contact arrangement for quickly inflating or deflating vehicular seat bladders, such as may be mounted in the thigh or lumbar regions of the seat for riding comfort or support.

While but one embodiment of the invention has been shown and described, other modifications thereof are possible.

The embodiments of the invention in which an exclusive property or privilege is claimed are defined as follows:

1. A switch and valve assembly comprising a housing, a pair of side-by-side chambers formed in said housing, a third chamber formed adjacent said side-by-side chambers in said housing, a pair of stems extending into said housing and being slidably mounted through said side-by-side chambers and into said third chamber, a pushbutton mounted on the outer end of each stem, a spring-loaded valve connected for movement with each of said stems in said respective side-by-side chambers and normally closed against a valve seat formed in the chambers but adapted to permit communication therethrough in one direction upon being partially opened by partial depression of said respective stems by said pushbuttons, a pair of normally open switches mounted in said third chamber and being closed only upon said valve being fully opened by full depression of said respective stems by said pushbuttons and adapted to thereby permit communication therethrough in the opposite direction overcoming any communication in said one direction.

2. A system comprising switch and valve assembly, a pump and a pair of bladders, said assembly including only one housing having an upper wall and a bottom wall, two side-by-side cylindrical chambers formed in said housing adjacent said upper wall and having respective end walls, a third chamber formed in said housing intermediate said end walls of said side-by-side chambers and said bottom wall of said housing, a pair of stems slidably mounted through openings formed in said upper wall and thence through said respective side-by-side chambers and openings formed in said end walls into said third chamber, a pushbutton mounted on the extended end of each of said pair of stems, a sleeve mounted between said upper wall and an annular shoulder formed in each of said side-by-side chambers, a seal formed around each of said sleeves, a valve seat formed on the bottom face of each of said sleeves, a valve secured to each of said stems in said respective side-by-side chambers, a spring mounted between each of said valves and said respective end walls for normally closing said valves against said valve seats until said respective pushbuttons are manually partially depressed, thereby permitting fluid to bleed-off from said respective bladders through one of a pair of passageways communicating between said side-by-side chambers and said respective bladders and thence through a third passageway communicating between both of said side-by-side chambers and said pump, a fixed post mounted in said third chamber, a V-shaped sheet-like spring member secured at its center to said fixed post and having legs extending therefrom, and a pair of switches mounted in said third chamber including a first pair of contacts secured to said respective legs and a second pair of contacts aligned with said first pair of contacts and secured to said bottom wall, said legs serving to maintain said contacts apart until either of said respective pushbuttons is manually fully depressed to thereby fully open one of said valves and engage one of said respective legs and lower same so as to bring said aligned contacts together and thereby actuate said pump to provide fluid under pressure through said third passageway, past said one of said fully open valves through one of said pair of passageways to inflate one of bleed-off through said one of said valves.

3. A swtich and valve assembly comprising a housing, only two normally-closed valves and two normally-open switches mounted in said housing, dual pushbutton and stem means for at times respectively selectively partially opening said valves without closing said switches, and for at times selectively fully opening said valves and closing said switches, two bladders communicating with said respective valves for bleeding-off fluid under pressure from said bladders when said valves are partially opened by said respective pushbutton and stem means, and pump means communicating fluid under pressure from a source of fluid to said bladders via said valves when said valves are fully opened and said switches are closed concurrently by said respective pushbutton and stem means, overcoming any tendency to bleed-off through said valves.

4. A switch and valve assembly comprising a housing, two bladders mounted externally of said housing, a source of fluid for filling said bladders, dual actuator means mounted in said housing and operatively connected to respective bladders for permitting the bleeding-off of said fluid from said respective bladders when said actuator means are respectively partially manually depressed in one direction, two normally open switches mounted in said housing, and pump means communicating fluid under pressure from said source to said bladders when said actuator means are respectively fully depressed in said one direction to close said respective switches, overcoming any bleeding-off from said bladders.

* * * * *